US012189340B2

(12) United States Patent
Bachmann

(10) Patent No.: US 12,189,340 B2
(45) Date of Patent: Jan. 7, 2025

(54) DEVICE FOR DISPLAYING A SUCCESSION OF PERIODIC EVENTS THAT FORM AN ANNUAL CYCLE AND TIMEPIECE COMPRISING SUCH A DISPLAY DEVICE

(71) Applicant: ETA SA Manufacture Horlogère Suisse, Grenchen (CH)

(72) Inventor: Stephane Bachmann, Bueren an der Aare (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 18/324,300

(22) Filed: May 26, 2023

(65) Prior Publication Data

US 2023/0384736 A1 Nov. 30, 2023

Related U.S. Application Data

(63) Continuation of application No. 16/824,937, filed on Mar. 20, 2020, now Pat. No. 11,733,653.

(30) Foreign Application Priority Data

Apr. 10, 2019 (EP) .................................... 19168378
Nov. 28, 2019 (EP) .................................... 19212220

(51) Int. Cl.
*G04B 19/22* (2006.01)
*G04B 19/247* (2006.01)

(52) U.S. Cl.
CPC ......... *G04B 19/223* (2013.01); *G04B 19/247* (2013.01)

(58) Field of Classification Search
CPC ........................... G04B 19/223; G04B 19/247; G04B 129/262; G04B 19/2532
See application file for complete search history.

(56) References Cited

U.S. PATENT DOCUMENTS 4,731,767 A 3/1988 Uehara
5,432,759 A 7/1995 Vaucher
(Continued)

FOREIGN PATENT DOCUMENTS

EP 0 634 711 A1 1/1995
EP 3 029 531 A1 6/2016
JP 2016-109689 A 6/2016

OTHER PUBLICATIONS

Office Action issued Feb. 24, 2021, in corresponding Japanese Patent Application No. 2020-047289 (with English Translation), 6 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A device for displaying a succession of periodic events, such as zodiac periods, which form an annual cycle, this display device including a periodic event indicator organ; a mechanism for managing a duration for displaying periodic events by the periodic event indicator organ, this management mechanism including a cam for managing a periodic event display duration arranged to control the change from the indication of a periodic event to the indication of a next periodic event by the periodic event indicator organ; a date indicator mechanism driven by a horological movement; a month finger controlled by the date indicator mechanism so as to advance the management cam by one pitch per month, and a periodic event finger disposed between the management cam and the periodic event indicator organ and arranged to drive the periodic event indicator organ during a change of periodic event.

7 Claims, 7 Drawing Sheets

(56) References Cited

U.S. PATENT DOCUMENTS

| | | | |
|---|---|---|---|
| 6,272,076 | B1 | 8/2001 | Dinger |
| 11,526,131 | B2 | 12/2022 | Bachmann |
| 2005/0013198 | A1 | 1/2005 | Born |
| 2005/0078558 | A1 | 4/2005 | Dalloz |
| 2006/0221772 | A1 | 10/2006 | Vuilleumier |
| 2016/0154378 | A1 | 6/2016 | Denden et al. |

OTHER PUBLICATIONS

Combined Taiwanese Office Action and Search Report issued Sep. 28, 2020, in corresponding Taiwanese Patent Application No. 109108409 (English Translation only}, 7 pages.

Combined Chinese Patent Application and Search Report issued Apr. 19, 2021 in Chinese Patent Application No. 202010274061.2 (with English translation), 9 pages.

European Search Report issued Nov. 5, 2019 in European Application 19168378.8 filed on Apr. 10, 2019(with English Translation of Categories of Cited Documents), 4 pages.

DEVICE FOR DISPLAYING A SUCCESSION OF PERIODIC EVENTS THAT FORM AN ANNUAL CYCLE AND TIMEPIECE COMPRISING SUCH A DISPLAY DEVICE

CROSS-REFERENCE TO RELATED APPLICATIONS

This application is a continuation of and claims priority to U.S. patent application Ser. No. 16/824,937, filed Mar. 20, 2020, which claims priority to European Patent Application No. 19168378.8 filed on Apr. 10, 2019 and European Patent Application No. 19212220.8 filed on Nov. 28, 2019, the entire disclosures of each which are hereby incorporated herein by reference.

TECHNICAL FIELD OF THE INVENTION

The present invention relates to a device for displaying a succession of periodic events which form an annual cycle. The present invention relates particularly to a device for displaying the sequence of the zodiac periods. The present invention also relates to a timepiece comprising such a display device.

TECHNOLOGICAL BACKGROUND OF THE INVENTION

An annual cycle can be divided into a number of periods which each comprise the same number of days or different numbers of days.

For example, an annual cycle of twelve months can be divided into twelve periods, each corresponding to one of the twelve signs of the zodiac. The peculiarity of these zodiac periods is that their durations are not identical: these durations are indeed comprised between 29 and 32 days. Moreover, the passage from a zodiac period to the following zodiac period takes place between the 20th and the 23rd of the concerned month according to the duration of the zodiac sign in question. For example, the zodiac period which corresponds to the sign of Sagittarius extends over 29 days from November 23 to December 21, while the zodiac period which corresponds to the sign of Cancer lasts 31 days from June 22 to July 22.

An annual cycle can also be divided into twelve periods corresponding to the twelve months of the year. These months are of unequal durations, comprised between 28 and 31 days.

Devices for displaying these periods are already known. The most rudimentary embodiments comprise a disc on which the different periods of an annual cycle are represented by means of angular sectors whose angle varies according to the number of days of the considered period. A first embodiment consists in rotating the disc under a dial wherein an aperture is formed through which the current period is visible. Another embodiment consists in rotating the disc opposite an index that points to the current period. Yet another embodiment consists in rotating a needle above the disc, the needle pointing to the current period.

The drive mechanisms of the disc on which the different periods of an annual cycle are indicated or of the needle which displaces above such a disc are of the jumping or trailing type and their advance is regular, so that the display of the current period lacks precision, particularly when transitioning from one period to the next period. Moreover, displaying time indications of different ranges on an element of a timepiece while time passes at an equal rate, gives a rather poor perception of the concerned timepieces.

A device for displaying periods forming an annual cycle is known from document EP 3 029 531 A1 in the name of Blancpain. The core of this display device is constituted by a differential mechanism with two inputs and one output. A first input is constituted by a reference drive wheel arranged to perform a turn according to a reference period. A second input is constituted by an activation organ arranged to cooperate with a cam which has a profile arranged so that the cooperation between the activation organ and the differential mechanism has the effect of advancing or retreating an organ indicating the periods depending on the difference between the displayed period and the reference period. Finally, the output is constituted by a drive organ of the indicator organ.

Thanks to these features, the Blancpain display device allows regularly representing periods which are not necessarily all equal to each other. Moreover, the choice of a differential mechanism to animate the display device allows positioning the period indicator organ at any location on the perimeter of the dial of the timepiece which is equipped with this display device. On the other hand, as is well known, a differential mechanism requires a large number of parts and is delicate to design. Consequently, such a display device is rather reserved for high-end parts whose cost price is high.

SUMMARY OF THE INVENTION

The present invention has the purpose of overcoming the problems mentioned above as well as others by providing in particular a device allowing to display equally a succession of periodic events of unequal durations which form an annual cycle.

To this end, the present invention relates to a device for displaying a succession of periodic events which form an annual cycle, this display device comprising:

- a periodic event indicator organ;
- a mechanism for managing the duration for displaying periodic events by the periodic event indicator organ, this management mechanism comprising:
  - a cam for managing a periodic event display duration arranged to control the change from the indication of a periodic event to the indication of a next periodic event by the periodic event indicator organ;
  - a month finger controlled by a date indicator mechanism so as to advance the management cam by one pitch per month, and
  - a periodic event finger disposed between the management cam and the periodic event indicator organ and arranged to drive the periodic event indicator organ during a change of event.

According to special embodiments of the invention:

- the date indicator mechanism comprises a date driving wheel which performs one complete turn per day and which drives a date indicator wheel at the rate of one complete turn in thirty-one days;
- the month finger is pivotally mounted on the date indicator wheel and is guided in translation and in pivoting by a first pin fixedly mounted in a movement plate;
- the month finger comprises a first beak, a first point of which describes a first path of conchoidal shape;
- at each end of the month, when the date indicator mechanism switches from the date indication "31" to the date indication "1", the first point of the first beak of the month finger engages with a first toothing of a month indicator wheel on which is fixed the cam for managing the periodic event display duration and advances this month indicator wheel by one pitch, this month indicator wheel performing one complete turn per year;

a lever, maintained bearing against a profile of the cam for managing the periodic event display duration, is disposed between this management cam and the periodic event finger;

the periodic event finger is mounted between the lever and the date indicator wheel;

the periodic event finger is pivotally mounted on the date indicator wheel and is guided in translation and in pivoting by a second pin fixedly mounted in the lever;

the periodic event finger comprises a second beak, a second point of which describes a second path of conchoidal shape;

once a month, during the passage from a periodic event to an immediately following periodic event, the second point of the second beak of the periodic event finger engages with a second toothing of the periodic event indicator organ to advance this periodic event indicator organ by one pitch, this periodic event indicator organ performing one complete turn per year;

at the beginning of the months when the change of periodic event must take place on a day of this month which is different from the day of the month when the change in previous periodic event took place, the management cam controls the fitting of the position of the periodic event finger which is pre-positioned so as to then be able to advance the periodic event indicator organ on the day of the current month when the transition from one periodic event to the next periodic event takes place;

the periodic event indicator organ is a periodic event indicator wheel which is indexed by a jumper and with which the periodic event finger meshes once a month, when switching from a periodic event to the immediately following periodic event;

when the periodic event indicator organ is adapted to display the zodiac periods, the profile of the management cam has a first radius which allows the indicator organ to switch the zodiac period during the night of the 22nd to the 23rd of the months of July, August, September, October and November, a second radius different from the first radius which allows the indicator organ to change the zodiac period during the night of the 21st to the 22nd of the months of December and June, a third radius, different from the first and second radiuses, which allows the indicator organ to change the zodiac period during the night of the 20th to the 21 st of the months of January, March, April and May, and a fourth radius, different from the first, second and third radiuses, which allows the indicator organ to change the zodiac period during the night of the 19th to the 20th of the month of February;

the profile of the management cam has a first portion of first constant radius for the months of July, August, September, October and November, then a second portion of second radius for the month of December, then a third portion of third radius for the month of January, then a fourth portion of fourth radius for the month of February, then a fifth portion of third constant radius for the months of March, April and May, and finally a sixth and last portion of second radius corresponding to the month of June.

The invention also relates to a timepiece comprising a device for displaying a succession of periodic events which form an annual cycle of the kind described above.

Thanks to these features, the present invention provides a mechanism for displaying periodic events forming an annual cycle whose construction is relatively simple and which is compact. Because of its relative simplicity of construction, the display mechanism according to the invention involves a smaller number of components, so that it is more economical to produce and that its operation is more reliable. On the other hand, since it is compact, the present display mechanism can be more easily housed in a larger number of calibres, without the need to always have to modify these calibres.

BRIEF DESCRIPTION OF THE FIGURES

Other features and advantages of the present invention will emerge more clearly from the following detailed description of an exemplary embodiment of a device for displaying the zodiac periods forming an annual cycle, this example being given in a purely illustrative and non-limiting manner only in relation with the appended drawing wherein.

DETAILED DESCRIPTION OF AN EMBODIMENT OF THE INVENTION

Figure 1A:
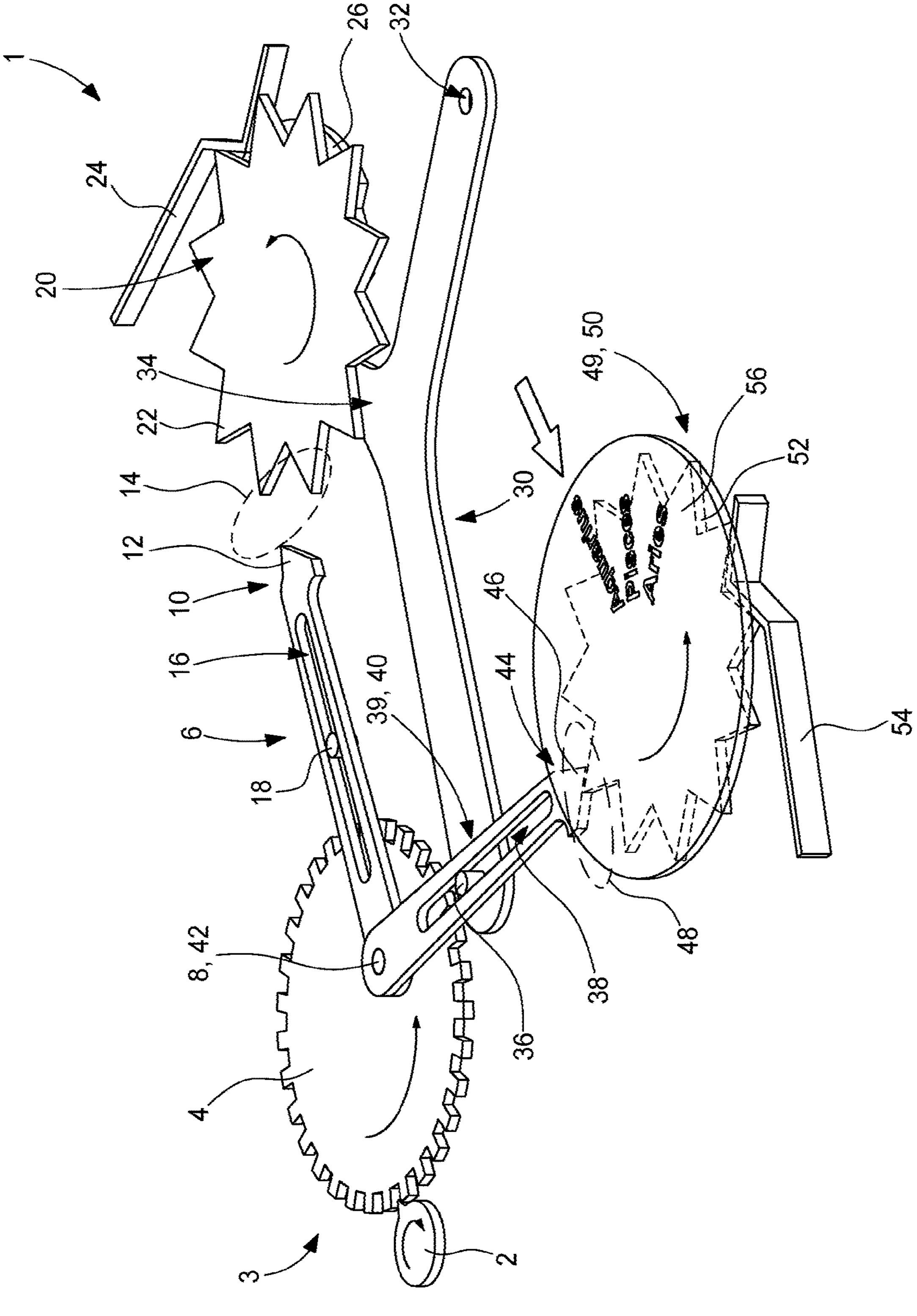
FIG. 1A is a top view of the display device according to the invention designed to display the succession of the zodiac periods in the position it occupies on February 19, just before the change of the zodiac period from Aquarius to Pisces.
Figure 1B:
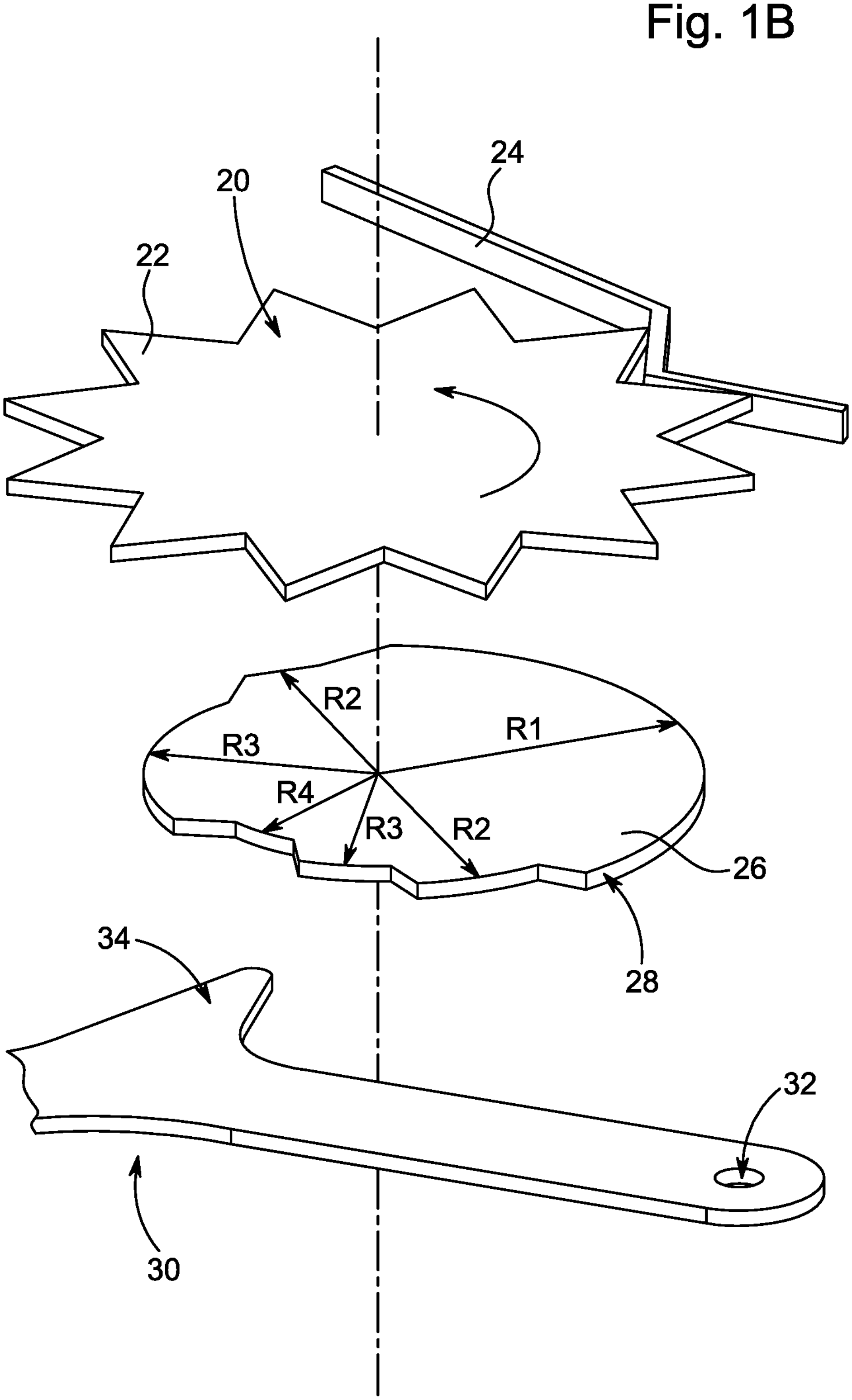
FIG. 1B is a detail view on a larger scale of FIG. 1A.
Figure 2:
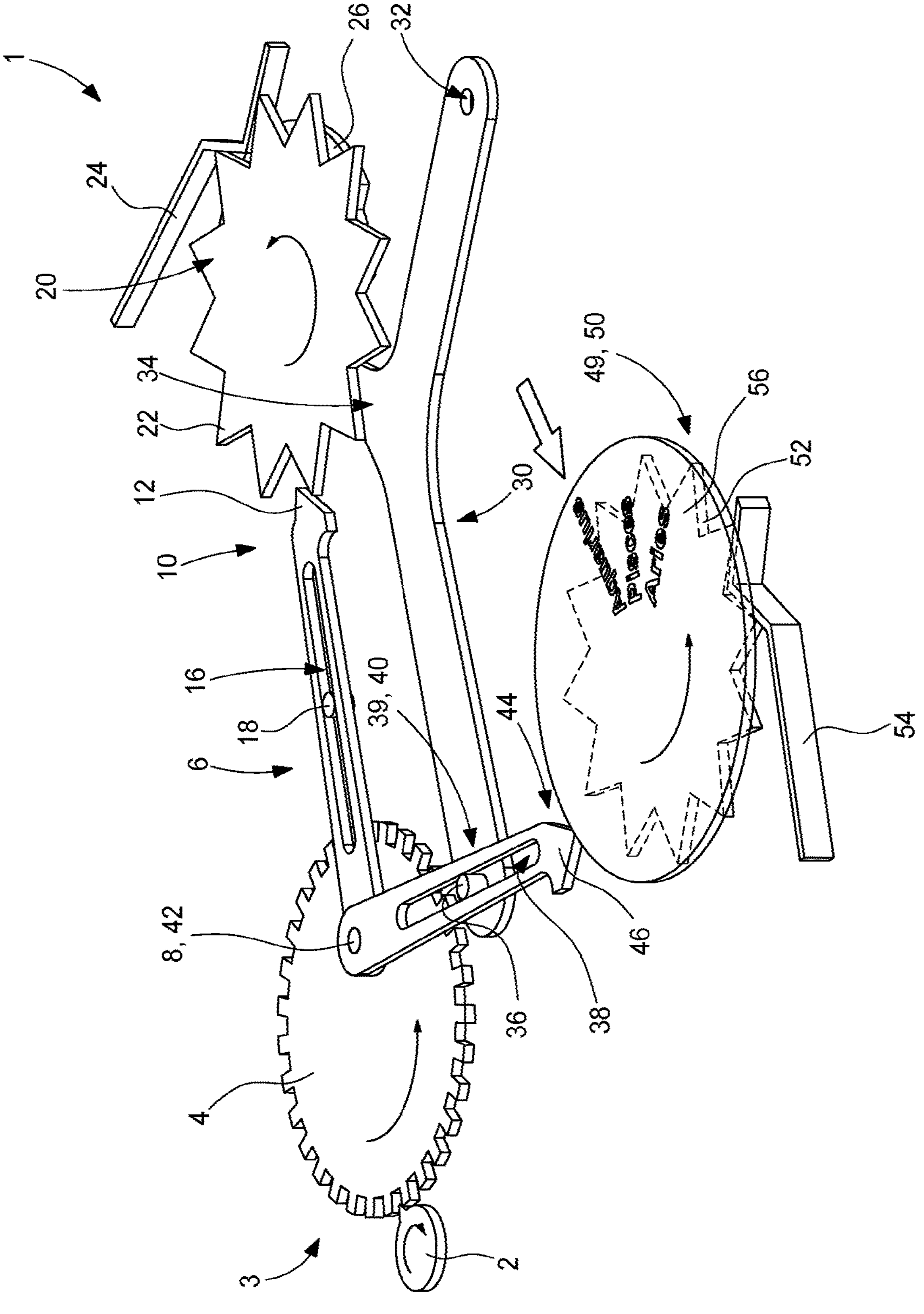
FIG. 2 is a view similar to that of FIG. 1 which illustrates the position of the display device when the device was brought to the date "31" to switch it to March 1.
Figure 3:
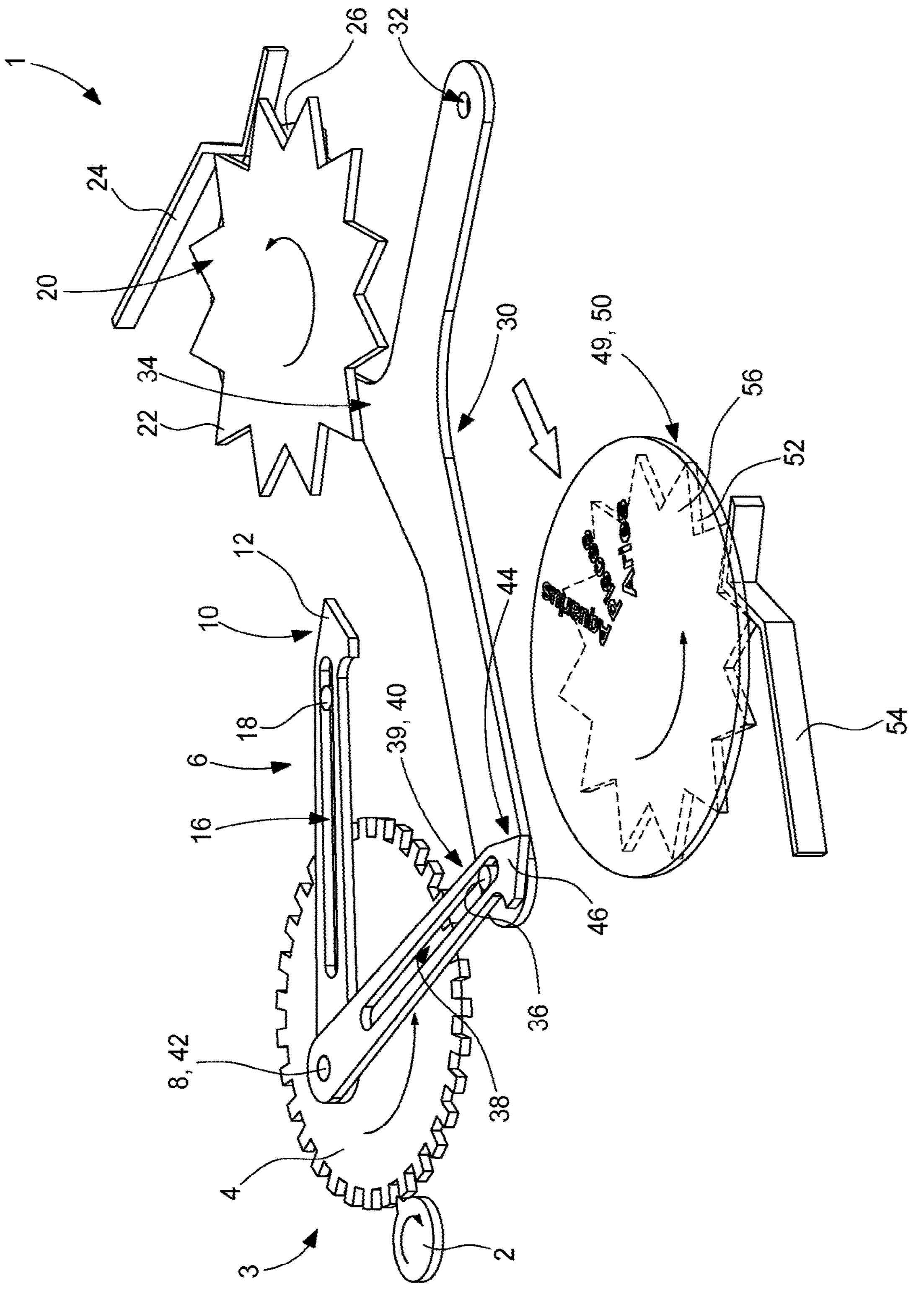
FIG. 3 is a view of the display device according to the invention in an intermediate position on March 10.
Figure 4:
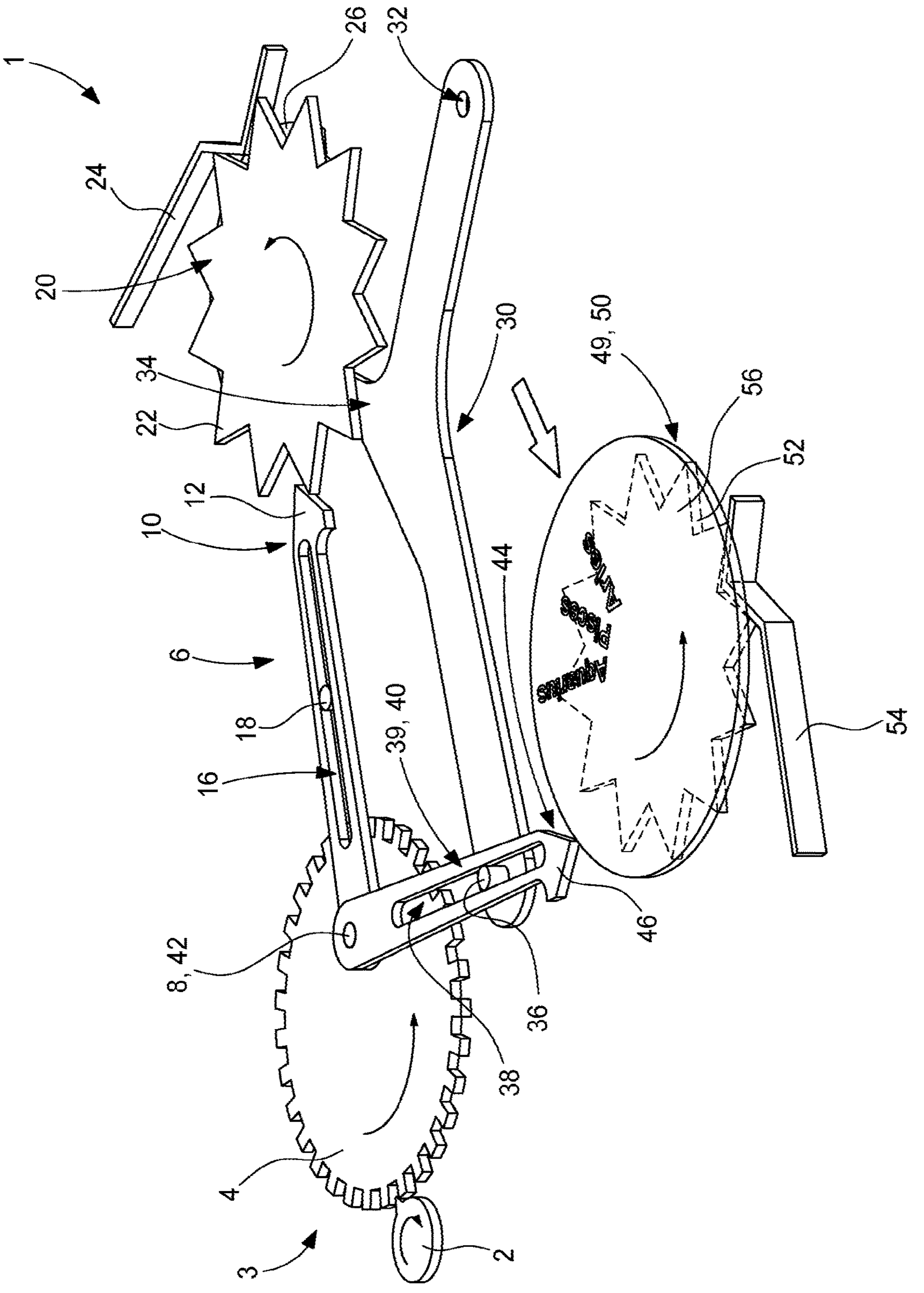
FIG. 4 is a detail view which illustrates the point of the beak of the month finger when the latter engages the toothing of the wheel indicating the months between the date "31" of the month of March and the date "1" of the following month.
Figure 5:
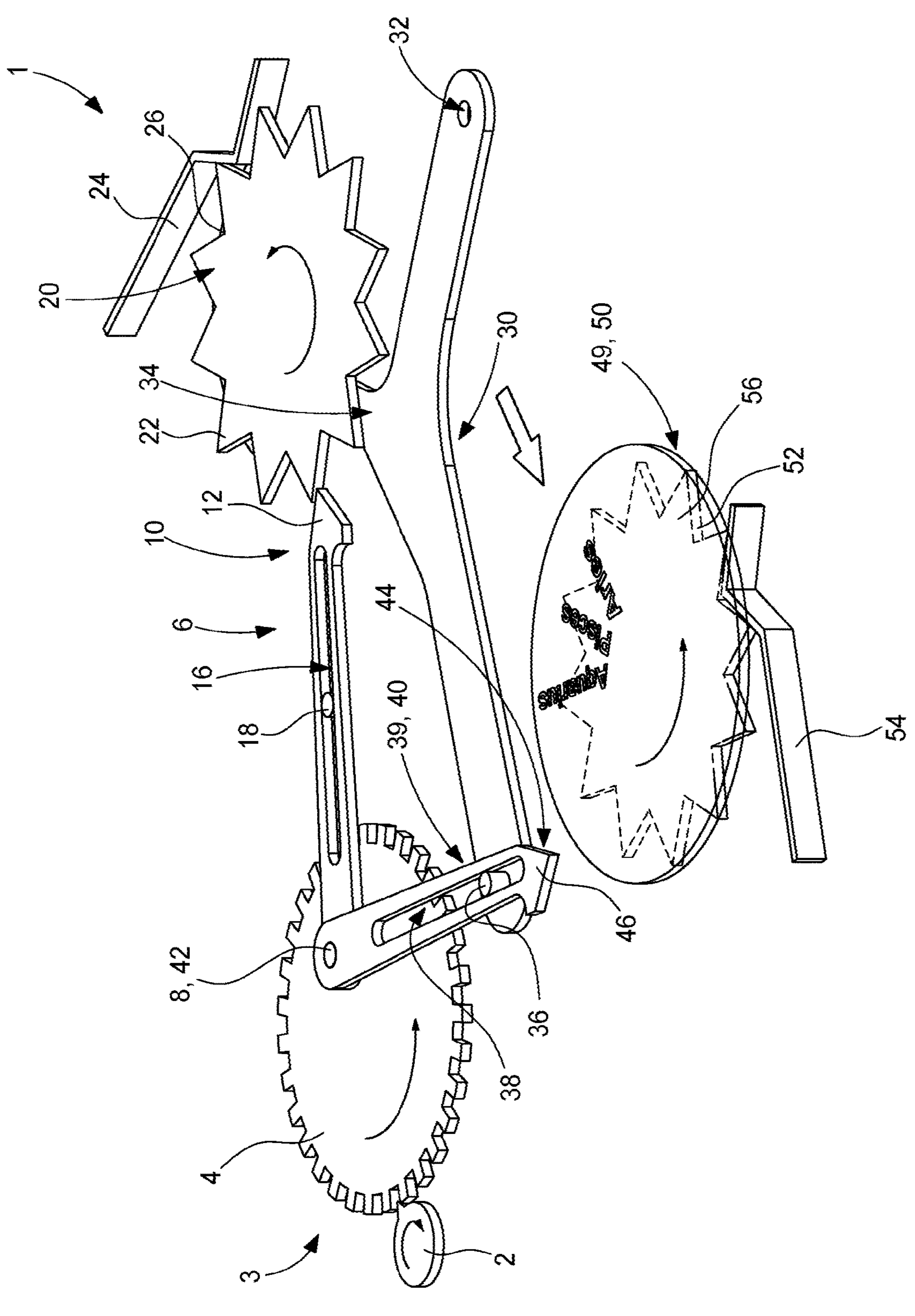
FIG. 5 is a view of the display device according to the invention in the position it occupies on April 1.

The present invention proceeds from the general inventive idea which consists in providing a device allowing to display in an equal and continuous manner periodic events which form an annual cycle and whose durations are not equal. To this end, the present invention provides a display device comprising a cam driven by a date and month indicator device and which, at the end of each month when necessary, pre-positions a lever so that, when the day of the passage from a periodic event to the immediately following periodic event comes, a display organ displays the relevant periodic event. Thanks to these features, the present invention thus provides a device for displaying periodic events forming an annual cycle which is continuously repositioned according to the day of the month when the periodic event to be considered begins. It is thus possible to display periodic events which do not necessarily succeed one another regularly over time without this being perceptible by the owner of the timepiece.

Care will be taken to note that, in the figures appended to this patent application, the directions of rotation of the various wheels are indicated by arrows.

Designated as a whole by the general reference numeral 1, the device for displaying a succession of periodic events which form an annual cycle according to the invention comprises a date indicator mechanism 3 which, in a preferred but non-exclusive embodiment, is provided with a date driving wheel 2 which is driven by a horological movement (not shown) at the rate of one turn per day. In turn, this date driving wheel 2 drives a date indicator wheel 4 at the rate of one pitch per day, this date indicator wheel 4 performing one complete turn in thirty-one days.

A month finger 6 is pivotally mounted on the date indicator wheel 4 around a first pivot axis 8 eccentrically carried by said date indicator wheel 4. This month finger 6 also comprises a first beak 10, a first point 12 of which describes a first path 14 of substantially conchoidal shape which is determined by an appropriate choice of the position of the pivot axis 8 on the date indicator wheel 4 and the length of this month finger 6. So that the point 12 of the beak 10 can describe a conchoidal path 14, the month finger 6 is also provided with a first oblong hole 16 wherein is engaged a first pin 18 fixedly mounted in a plate of the horological movement and which ensures pivotally and translatably guiding the month finger 6.

The display device 1 according to the invention also comprises a month indicator wheel 20 which advances by one pitch per month and which performs one complete turn per year. To this end, the month finger 6 is arranged so that, during each passage from the date "31" to the date "1" of the following month, the point 12 of the beak 10 penetrates into a first toothing 22 of this month indicator wheel 20 and advances the latter by one pitch. After having driven the month indicator wheel 20, the point 12 of the beak 10 of the month finger 6 is released from the toothing 22 of the month indicator wheel 20 and will not engage with this toothing 22 until the passage of the date "31" to the next date "1". In the meantime, the position of the month indicator wheel 20 is indexed by a first jumper spring 24.

When the month indicator wheel 20 advances by one pitch, it drives therewith a cam 26 for managing the periodic event display duration which is fixedly mounted on this month indicator wheel 20.

The display device 1 described here is arranged to display the succession of the 12 signs of the zodiac. It will nevertheless be understood that this example is only given for a purely illustrative purpose and that, with an adaptation of the management cam 26, it is quite possible to display another succession of periodic events having the particularity of forming an annual cycle. Particularly the display of the Chinese horoscope is considered.

In the zodiac system called tropical zodiac system which is of interest here, the 12 periods of the zodiac start, as the case may be, on the 20th, the 21st, the 22nd or the 23rd of the concerned month. Moreover, when two successive zodiac periods do not start on the same day of the month, there is never more than one day of difference between the beginning of the first considered zodiac period and the beginning of the immediately following zodiac period. More specifically, from March to May, the concerned periods of the zodiac, namely Aries, Taurus and Gemini, all start on the 21st of the month. The next zodiac period, that of Cancer, in turn, begins on June 22. From July to November, the corresponding zodiac periods, namely Leo, Virgo, Libra, Scorpio and Sagittarius, all start on the 23rd of the month. In December, the Capricorn period starts on the 22nd, in January, the Aquarius period starts on the 21 st, and in February, the Pisces period starts on the 20th.

As will be better understood below, the management cam 26 is arranged so that the display device 1 changes from a zodiac period on the first day of the considered zodiac period. Thus, a profile 28 of the management cam 26 has a first radius R1 which will allow the display device 1 to change the zodiac period during the night of the 22nd to the 23rd of the months of July, August, September, October and November. Similarly, the profile 28 of the management cam 26 has a second radius R2 different from the first radius R1 which will allow the display device 1 to change the zodiac period during the night of the 21st to the 22nd of the months of June and December. Similarly, the profile 28 of the management cam 26 has a third radius R3, different from the first and second radiuses R1 and R2, which will allow the display device 1 to change the zodiac period during the night of the 20th to the 21st of the months of January, March, April and May. Finally, the profile 28 of the management cam 26 has a fourth radius R4, different from the first, second and third radiuses R1, R2 and R3, which will allow the display device 1 according to the invention to change the zodiac period in the night of the 19th to the 20th of February.

Thus, the profile 28 of the management cam 26 has a first portion of constant radius R1 for the months of July, August, September, October and November, then a second portion of radius R2 for the month of December, then a third portion of radius R3 for the month of January, then a fourth portion of radius R4 for the month of February, then a fifth portion of constant radius R3 for the months of March, April and May, and finally a sixth and last portion of radius R2 corresponding to the month of June.

In accordance with the invention, the display device 1 also comprises a lever 30 pivotally mounted about a second pivot axis 32 fixedly mounted in the plate of the horological movement. This lever 30 has a feeler finger 34 by which it is applied against the profile 28 of the management cam 26. This lever 30 also carries a second pin 36 which protrudes into a second oblong hole 38 formed in a finger of the periodic events 39 for which it ensures both pivoting and translational guidance. This periodic event finger 39 which, in the example relating to the display of the zodiac system described here, is in the form of a zodiac finger 40, is pivotally mounted on the date indicator wheel 4 about a third pivot axis 42 eccentrically carried by said date indicator wheel 4. This zodiac finger 40 also comprises a second beak 44, a second point 46 of which describes a second path 48 of substantially conchoidal shape which is determined by the positioning of the third pivot axis 42 on the date indicator wheel 4 and by the length of this zodiac finger 40.

The display device 1 according to the invention also comprises a zodiac indicator organ 49. In the example shown in the drawing for illustrative purposes only, this organ is a zodiac indicator wheel 50 which advances by one pitch during each change of the zodiac period and which performs one complete turn per year. To this end, the zodiac finger 40 is arranged so that, at each change of the zodiac period, the point 46 of its beak 44 penetrates into a toothing 52 of the zodiac indicator wheel 50 and advances the latter by one pitch. After having driven the zodiac indicator wheel 50 by one pitch, the point 46 of the beak 44 of the zodiac finger 40 is released from the toothing 52 of the zodiac indicator wheel 50 and will not be engaged again with this toothing 52 until the next change of the zodiac period. In the meantime, the position of the zodiac indicator wheel 50 is indexed by a second jumper spring 54. The assembly is completed, for example, by a zodiac indicator disc 56 on which are indicated the zodiac indications, these zodiac indications being for example visible through an aperture formed in a dial of the timepiece and whose position is indicated by a double arrow on the drawing.

Figure 6:
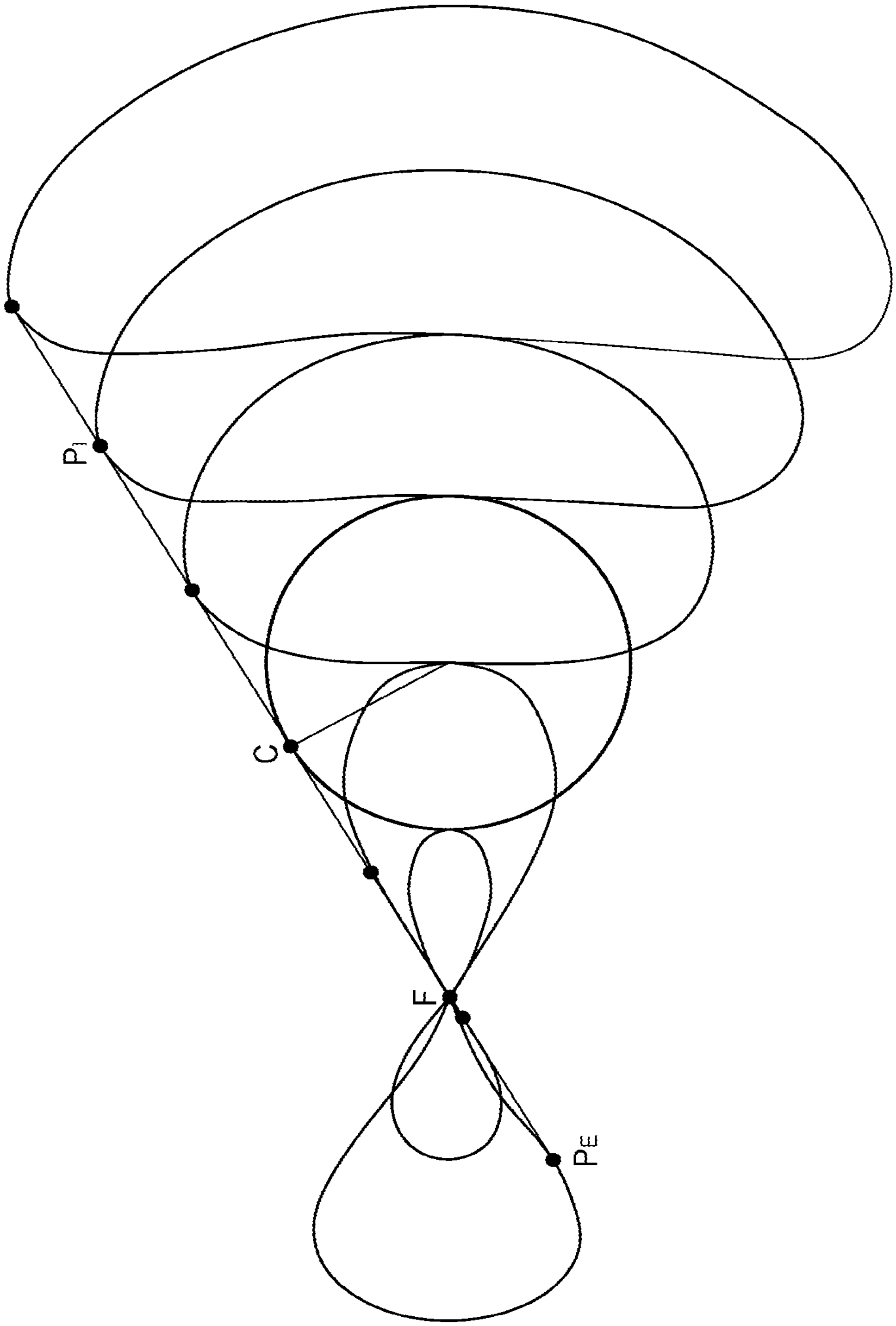
FIG. 6 is a schematic representation of the path of a circle conchoid type from the point of the beak of the month finger, respectively from the point of the beak of the zodiac finger.

It goes without saying that the present invention is not limited to the embodiment which has just been described and that various simple modifications and variants can be considered by the person skilled in the art without departing from the scope of the invention as defined by the appended claims. Particularly, it will be understood that, although the present invention has been described in connection with the display of the twelve periods of the zodiac, this invention is not limited to such an embodiment and can be applied to the display of other periodic events forming an annual cycle. In particular, the display of the Chinese horoscope is considered. It will also be understood that although, in the present description, the only case considered is the case wherein the month finger 6 and the zodiac finger 40 are pivotally mounted on the date indicator wheel 4 about two coincident pivot axes 8, 42 carried by said date indicator wheel 4, a simplified embodiment wherein the month finger 6 and the zodiac finger 40 are pivotally mounted about two distinct pivot axes carried by the date indicator wheel 4 is also considerable. It will also be understood that, as illustrated in FIG. 6, the first point 12 of the first beak 10 of the month 6 finger describes a path of substantially conchoidal shape. "Circle conchoid" means a two-dimensional curve which is the path of a point $P_I$ of a connecting-rod, namely the month finger 6, required to slide by a fixed pole F, namely the first pin 18 fixedly mounted in the plate of the horological movement, and a point C of this connecting-rod describes a circle. Considering the point $P_E$ of the connecting-rod located, starting from the circle described by point C, after the fixed pole F, the path schematically illustrated in FIG. 1A made by the point 12 of the beak 10 of the month finger 6 is obtained. The point 46 of the beak 44 of the zodiac finger 40 also describes a circle conchoid path.

NOMENCLATURE

1. Device for displaying a succession of periodic events which form an annual cycle
2. Date driving wheel
3. Date indicator mechanism
4. Date indicator wheel
6. Month finger
8. First pivot axis
10. First beak
12. First point
14. First path
16. First oblong hole
18. First pin
20. Month indicator wheel
22. First toothing
24. First jumper spring
26. Management cam
28. Management cam profile
30. Lever
32. Second pivot axis
34. Feeler finger
36. Second pin
38. Second oblong hole
39. Periodic event finger
40. Zodiac finger
42. Third pivot axis
44. Second beak
46. Second point
48. Second path
49. Periodic event and zodiac indicator organ
50. Zodiac indicator wheel
52. Second toothing
54. Second jumper spring
56. Zodiac indicator disc

The invention claimed is:

1. A device for displaying a succession of periodic events which form an annual cycle, said display device comprising:
- a periodic event indicator organ;
- a mechanism for managing a duration for displaying periodic events by the periodic event indicator organ, said management mechanism comprising:
- a cam for managing a periodic event display duration arranged to control the change from the indication of a periodic event to the indication of a next periodic event by the periodic event indicator organ;
- a date indicator mechanism driven by a horological movement;
- a month finger controlled by the date indicator mechanism so as to advance the management cam only in a same direction by one pitch per month, and
- a periodic event finger disposed between the management cam and the periodic event indicator organ and arranged to drive the periodic event indicator organ during a change of periodic event.

2. The display device according to claim 1, wherein the date indicator mechanism comprises a date driving wheel which performs one complete turn per day and which drives a date indicator wheel at the rate of one complete turn in thirty-one days.

3. The display device according to claim 2, wherein the month finger is pivotally mounted on the date indicator wheel.

4. The display device according to claim 3, wherein the periodic event finger is pivotally mounted on the date indicator wheel.

5. The display device according to claim 2, wherein the periodic event finger is pivotally mounted on the date indicator wheel.

6. The display device according to claim 1, wherein the periodic event indicator organ is a zodiac indicator wheel that advances by one pitch during each change of a zodiac period and performs one complete turn per year.

7. The display device according to claim 1, wherein the month finger and the periodic event finger are pivotally mounted about a same axis.

* * * * *